G. C. PINGER.
APPARATUS FOR ELECTROPLATING.
APPLICATION FILED JAN. 24, 1917.
1,336,052.
Patented Apr. 6, 1920.
2 SHEETS—SHEET 1.
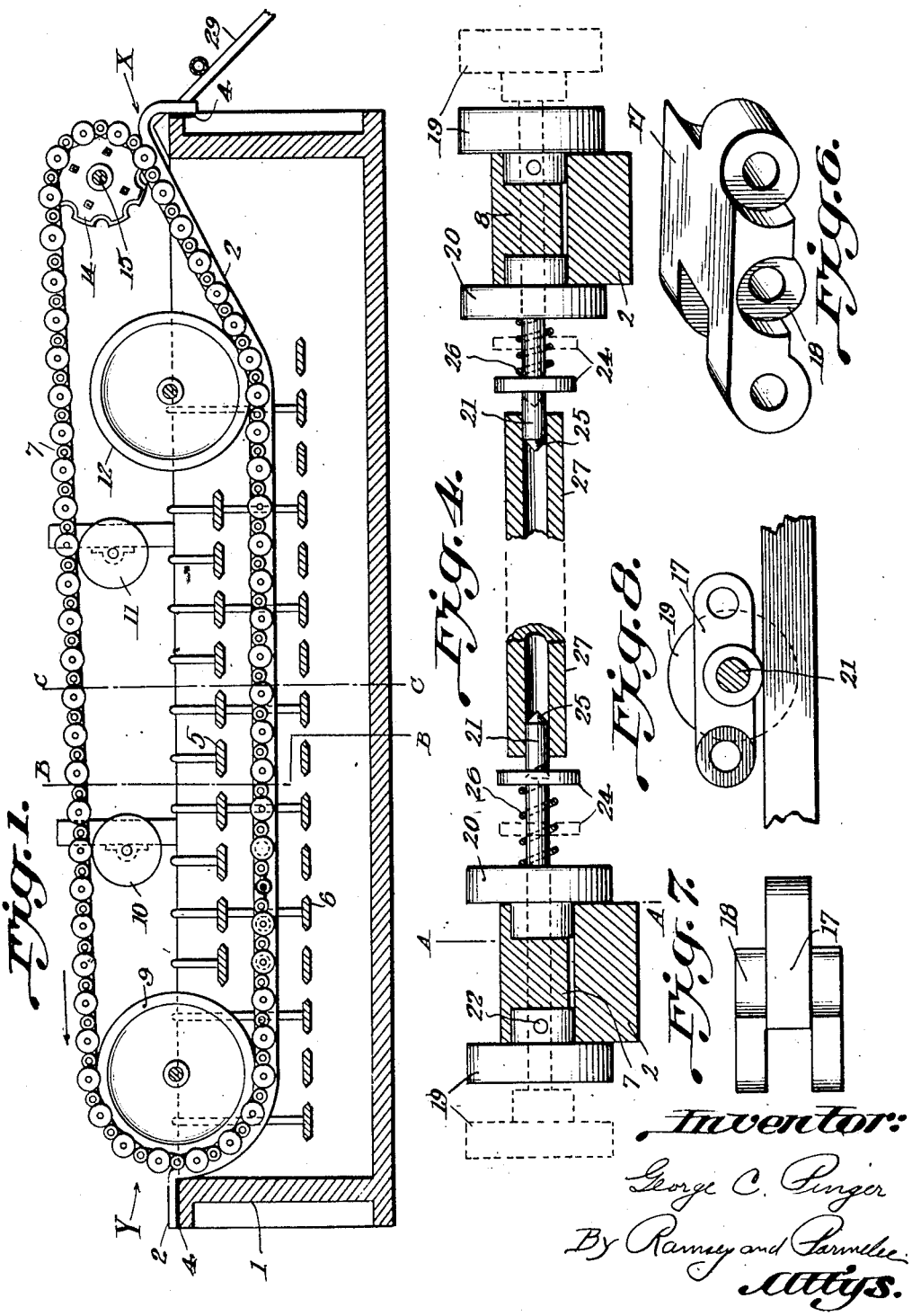

G. C. PINGER.
APPARATUS FOR ELECTROPLATING.
APPLICATION FILED JAN. 24, 1917.
1,336,052.
Patented Apr. 6, 1920.
2 SHEETS—SHEET 2.
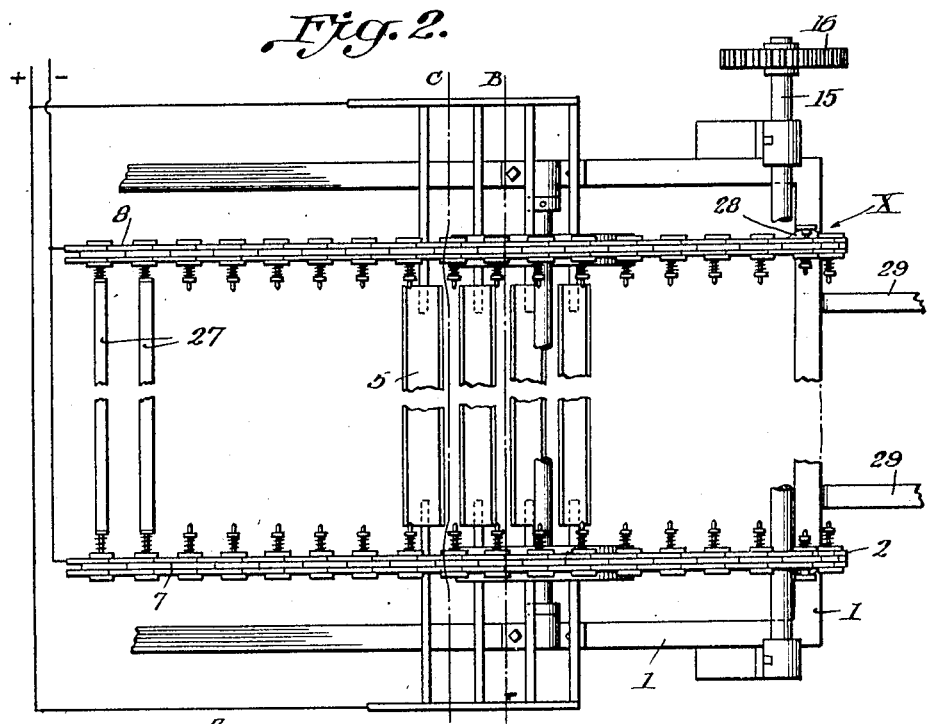
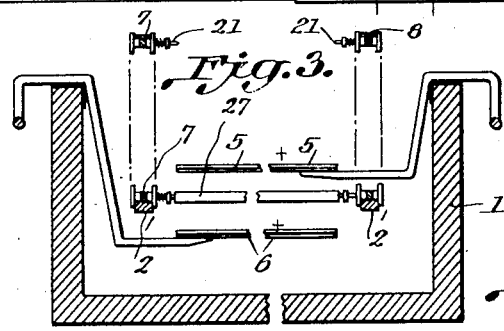
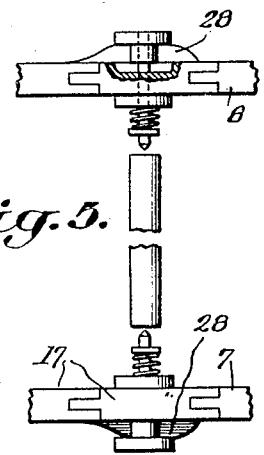
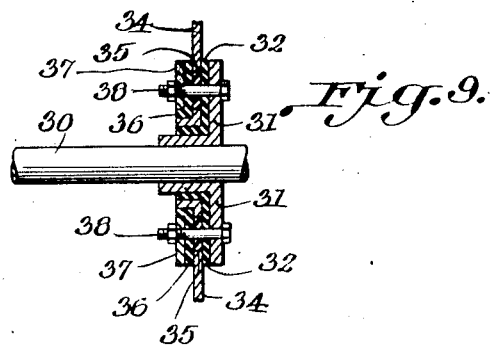
Inventor:
George C. Pinger
By Ramsey and Parmelee
Attys.

UNITED STATES PATENT OFFICE.

GEORGE C. PINGER, OF NEW YORK, N. Y., ASSIGNOR OF ONE-HALF TO REPUBLIC IRON AND STEEL COMPANY, A CORPORATION OF NEW JERSEY.

APPARATUS FOR ELECTROPLATING.

1,336,052.     Specification of Letters Patent.     Patented Apr. 6, 1920.

Application filed January 24, 1917. Serial No. 144,126.

*To all whom it may concern:*

Be it known that I, GEORGE C. PINGER, a citizen of the United States, and a resident of the city of New York, in the county of New York, State of New York, have invented certain new and useful Improvements in Apparatus for Electroplating, of which the following is a specification.

This invention relates broadly to electrochemistry and more particularly to a method and apparatus for galvanizing articles by electroplating and wherein the surfaces to be galvanized are maintained at all times out of contact with the supports for the articles.

One of the principal objects of the present invention is to provide an apparatus more particularly designed to galvanize sections of pipe and similar articles wherein the articles to be galvanized are supported at their ends and rotated during the galvanizing operation.

Another object of this invention is to provide a mechanism for galvanizing large quantities of pipe sections and similar objects wherein each pipe section is supported at its ends with the surface to be galvanized out of contact with the supports and wherein the pipe is rotated during the galvanizing operation.

A still further object of the present invention is to provide an apparatus for galvanizing large quantities of sections of pipe and similar articles by providing supports for a plurality of pipe sections and providing a relative movement between anodes and the pipe sections and maintaining the surfaces to be galvanized out of contact with the pipe supports during the galvanizing operation.

A still further and more specific object of the present invention is to provide an electroplating apparatus for continuously galvanizing sections of pipe in large quantities and wherein the sections of pipe are carried through the electrolyte in a continuous series with a longitudinal and rotary movement relative to anodes suspended in the electrolyte and with the surfaces to be galvanized maintained at all times out of contact with the supports for the pipes.

A still further and more specific object of the present invention is to provide an electrogalvanizing apparatus comprising a relatively long tank through which extend the lower runs of continuous chains adapted to carry supports fitting in the ends of pipe sections with the lower runs of said chains being supported by and in contact with bus-bars or conductors within the electrolyte.

A still further and equally primary object of the present invention consists in the methods of electrogalvanizing pipe sections and similar objects by supporting said sections upon their end surfaces and rotating such sections relatively to suitable anodes during the period while metal is being deposited upon the said pipe sections.

A still further and important object of the present invention comprises the method of electrogalvanizing pipe sections which consists in maintaining the surfaces of the pipe sections to be galvanized out of contact with all materials other than the electrolyte and moving said sections of pipe through the electrolyte and between suitable anodes while said sections of pipe are electrically connected with the cathode terminal of the electric circuit which includes the electrolyte and the said anodes.

A still further and important object of the present invention is the method of galvanizing sections of pipe and similar hollow articles which consists in completely submerging in an electrolyte the sections of pipe to be galvanized, supporting said pipe entirely upon its interior surface and then moving said pipe relative to suitable anodes during the period when metal is being deposited upon the pipe.

Other and further objects of the present invention will in part be obvious and will in part be pointed out hereinafter in the specification following by reference to the accompanying drawings wherein like parts are represented by like characters throughout the several views thereof.

The drawings are more or less diagrammatic in character, and

Figure 1 illustrates a section taken on substantially the midvertical plane of the apparatus.

Fig. 2 is a detail plan view illustrating the delivery end of the apparatus.

Fig. 3 is a detail sectional view taken between lines B and C of Fig. 2.

Fig. 4 is a detail view of the tube supporting mechanism.

Fig. 5 is a detail view illustrating the mechanism for automatically withdrawing the supports to permit the tubes to be ejected from the delivery end of the machine.

Figs. 6, 7 and 8 are detail views of a carrying link.

Fig. 9 is a detail view illustrating one construction adapted for use in insulating the various wheels for supporting the chain.

Heretofore in the art various types of apparatuses have been designed for electrogalvanizing pipe sections and similar articles. In one type of apparatus the pipes are supported upon hooks or brackets and suspended in the electrolyte. The difficulty with this type of device is that unless each pipe is moved on its support during the plating operation no metal will be deposited at the points of contact between the support and the pipe. Another type of machine comprises a mechanism wherein the pipes are rolled through the electrolyte and are supported upon conductor bars which complete the electric circuit by line or point contact with the pipe sections. In this type of apparatus the pipe receives considerable less plating on the zone wherein the pipe is rolled upon the conductors, than upon other portions of the pipe which are only in contact with the electrolyte.

My method as herein disclosed, and one form of apparatus for carrying out my method, also herein disclosed, obviates the difficulties encountered in the known prior art by supporting the pipe sections in such manner that only the electrolyte touches the portions of the pipe to be plated and this may be accomplished by supporting the pipe entirely upon its inner surfaces as for example by inserting suitable conductor plugs within the ends of the pipe sections. These conductor plugs may be supported in various ways but preferably are supported upon continuously traveling endless chains which are electrically connected with the cathode terminal of an electric circuit, preferably through bus-bars or conductors submerged in the electrolyte and adapted to form supports for the lower runs of the chains.

In order to facilitate the mounting of pipe sections upon these plugs they may be spring supported so that the plugs may be forced apart to receive a pipe length and then be urged together so that opposite plugs are spring pressed to enter the ends of the pipe. Such a construction may be operated at the delivery end of the chain run to eject the pipe sections from the machine by providing cams constructed to withdraw the plugs from the ends of the pipe and permit the sections of pipe to be released and dropped upon suitable guide rails which deliver the pipes from the machine.

Referring now more particularly to the drawings wherein I have illustrated one form of machine for carrying out my process, the electrolyte is adapted to be contained in a relatively long shallow tank 1 through which extends a pair of parallel bus-bars or conductors 2 which are suitably insulated as at 4 from the tank 1. Preferably two rows of anodes 5 and 6 are arranged between the bus-bars 2 and above and below the path taken by the pipes as will be hereinafter explained. A pair of parallel endless chains 7 and 8 are mounted upon supporting wheels 9, 10, 11 and 12 and extend over a pair of sprocket wheels 14 which are carried upon a power shaft 15 which is suitably driven as through the sprocket wheel 16 by any suitable source of power. The endless chains 7 and 8 may be formed of links 17 which have provision as at 18 to support flanged wheels 19 and 20. The flanged wheels 19 and 20 are carried by supporting plugs 21 with the flanged wheel 19 secured to the said plug as by means of a rivet 22 while the wheel 20 is loosely mounted upon the supporting plug 21. The supporting plug 21 is provided with a flange or collar 24 which is located a short distance from the point 25 and a coiled spring 26 is mounted between the flanged collar 24 and the wheel 20. By this construction it will be noted that the supporting plugs 21 may be moved to compress the coiled springs 26 and to remove the points 25 from the ends of a pipe section 27 as shown in dotted lines in Fig. 4. Ejector cams 28 (see Fig. 5) are provided as at X (Fig. 1) to withdraw the plugs 25 from the ends of the pipe sections at this point thereby permitting the pipe sections to fall upon guide rails 29 and be ejected from the machine. Preferably the guiding and supporting wheels 9, 10, 11, 12 and the sprocket wheels 14 are all suitably insulated from their respective shafts as for example by the construction illustrated in Fig. 9 wherein the shaft 30 carries a hub 31 upon which rests an insulating collar 32 that supports the wheel frame 34. The bolt opening through the wheel frame is insulated by a washer or plug 35 and the face of the wheel frame is further insulated by a band of insulation 36 upon which is supported a reinforcing metal collar 37 the whole of these parts being secured together by means of bolts 38.

In the operation of this machine a workman inserts a plug in the end of a pipe section as at the point Y in Fig. 1 and by moving the supporting plug against the coiled spring 26 the pipe may be properly positioned horizontally with the opposing plug inserted in the other end from which time on until it is automatically released as at X, the pipe section is carried by and supported entirely upon the plugs 21. The endless chain has a slow movement in the direction of the arrow (Fig. 1) and it will therefore be seen that pipe sections inserted at Y are gradually submerged in and carried through the electrolyte while the metal conductor wheels 19 and 20 form an electrical connection between the pipe sections 27, the supporting plugs 21 and the bus-bars or conductors 2. As the endless chain moves the hub portions of the said wheels 19 and 20 roll upon the bus-bars or conductors so that the pipe sections 21 continuously rotate during their passage through the electrolyte and between the anodes 5 and 6. The bus-bars 2 as previously stated are connected with the cathode terminal of an electric circuit including the anodes so that by this apparatus the pipe sections are supported in such manner that the metal is deposited thereon evenly because the surface under treatment is maintained at all times out of contact with any supporting member and the surface is slowly rotated relatively to the anodes. It will be noted that when the machine is in operation the supports in the lower run of the endless chains and between the points Y and X will carry sections of pipe whereas the supports on the upper run of the chain between X and Y will be returning empty.

Realizing that my invention is broader in scope than the specific disclosure herein set forth I desire that it be understood the disclosure herewith is illustrative and not to be taken in the limiting sense.

Having thus described my invention what I claim is:

1. In a device of the character described, the combination of an endless chain having a portion thereof extending through an electro-plating solution, a support for the portion of the chain passing through the solution, said support comprising a bus-bar, and means upon said chain for supporting and rotating the work to be electro-plated.

2. In a device of the character described, in combination, a pair of parallel bus-bars extending lengthwise of and beneath the soluton in an electro-plating tank, a pair of carrier chains mounted above said bus-bars and having a portion of the chains supported upon said bus-bars, and supporting means secured to and carried by said chains and adapted to suspend and rotate work between said chains.

3. In a device of the character described, the combination of a tank, a traveling chain extending into the solution in the tank, supporting means attached to said chain and adapted to support and rotate material to be moved through the tank, and a bus-bar beneath and supporting a portion of said chain, said bus-bar being connected with the cathode terminal of an electric current.

4. In a device of the character described, in combination, a pair of parallel bus-bars extending lengthwise of and submerged in an electro-plating tank, a pair of carrier chains mounted above said bus-bars and having a portion of the chains supported upon said bus-bars, supporting means secured to and carried by said chains and adapted to suspend and rotate work between said chains, and means to automatically release the work.

5. In a device of the character described, the combination with a traveling chain, means upon said chain to support material being moved through an electro-plating solution, of a fixed conductor over which the chain travels and with which the chain is in electrical contact, and means to uniformly and continuously rotate the material while being moved through the plating solution.

6. In a device of the character described, the combination of supporting means for moving material through an electro-plating solution, of a conductor connected with the said material, devices on the moving means for supporting the said material with the surfaces to be treated in contact only with the electro-plating solution, and means to uniformly and continuously rotate the material during the plating operation.

7. In a device of the character described, in combination, traveling means for supporting and moving material to be plated through an electro-plating solution, a relatively large bus-bar in contact with said means throughout the portion submerged in said solution, and means to uniformly and continuously rotate the material during the plating operation.

8. A pair of parallel conductors adapted to be submerged in an electro-plating solution, conveyer means traveling over and upon said conductors as supporting members, said conveyer means being adapted to support and rotate material to be electro-plated, whereby said material is rotated and maintained out of direct contact with said conductors.

9. A device for plating pipe and similar hollow articles consisting of supporting means comprising a traveling chain, plugs mounted upon said supporting means and being adapted to enter within the ends of the hollow member to be plated, means electrically connecting said supports with the cathode terminal of an electric circuit, and means for rotating said plugs during the plating operation.

10. In an apparatus for plating pipe sections and the like, a support comprising a traveling chain, electrically connected with the cathode terminal of an electric circuit, means carried by said support and adapted to enter a pipe section and support the same on the interior surface thereof, devices to cause said means to rotate during the travel of said chain, an electro-plating solution in which said support is adapted to be immersed, and anodes within said solution.

11. A device adapted to electro-plate pipe sections and similar hollow articles, consisting of a pair of tracks immersed in an electro-plating solution, wheeled carriers comprising links of an endless chain and movably mounted upon said tracks, means upon said wheeled carriers for supporting and moving pipe sections through an electro-plating solution, said tracks being connected with the cathode terminal of an electric circuit, and anodes within said solution and adjacent the path of a pipe section in its movement through the plating solution.

12. An apparatus for plating pipe sections and similar hollow articles consisting of a pair of parallel tracks extending through an electro-plating solution, a plurality of wheeled carriers comprising wheels mounted upon links of a chain, said wheel carriers being adapted to carry plugs constructed to enter the ends of pipe sections whereby pipe sections may be moved in a continuous series through said electro-plating solution, said tracks being electrically connected with the cathode terminal of an electric circuit, and anodes adjacent the path traveled by the pipe sections.

13. An apparatus for plating pipe sections and the like, consisting of a pair of endless chains mounted parallel, means for slowly moving said chains, supports for said chains whereby the lower run of said chains extends into and through an electro-plating solution, wheeled members carried by the links of said chains, a pair of parallel conductor tracks upon which the lower run of the chains is supported, and spring-pressed plugs mounted upon each chain and extending toward the opposite chain whereby said plugs may be inserted in pipe sections to carry said pipe sections through the electro-plating solution.

14. As an article of manufacture, a pipe support for an electro-plating member adapted to plate pipe sections and the like, consisting of a link, wheels mounted upon opposite sides of said link, a pin having a movement relative to said link, and a spring for normally maintaining the head of said pin outwardly from said link in such manner that upon the compression of said spring said head of the pin is moved toward the said link, substantially as described.

15. In a device for electro-plating pipe sections and the like, the combination of a track submerged in the electrolyte, a rolling member comprising a link in an endless chain and rolling upon and supported by said track, and an article carrier connected to said rolling member in such manner that the rotation of said rolling member rotates said article carrier whereby an article supported on said article carrier is rotated during its translatory movement through the electrolyte.

16. A device adapted to electro-plate pipe sections and similar hollow articles, comprising a pair of tracks immersed in an electro-plating solution, wheeled carriers adapted to travel on said tracks, and means on said carriers for supporting and moving pipe sections through the electro-plating solution, said means constituting supports for the wheels of said carriers.

17. A device adapted to electro-plate pipe sections and similar hollow articles, comprising a pair of tracks immersed in an electro-plating solution, wheeled carriers adapted to travel on said tracks, and means on said carriers for supporting and moving pipe sections through the electro-plating solution, said means constituting supports for the wheels of said carriers whereby the article is rotated continuously throughout the travel of the carrier.

18. A device adapted to electro-plate pipe sections and similar hollow articles, comprising a pair of tracks immersed in electro-plating solution, wheeled carriers adapted to travel on said tracks, spring pressed means on said carriers for supporting and moving pipe sections through the electro-plating solution, and means on the tracks for moving said spring pressed means to release the article supported thereby.

19. In a device of the character described, the combination of an endless chain having a portion thereof extending through an electro-plating solution, a bus-bar constituting a track for said carrier, and means carried by said chain and traveling on said track for supporting and rotating work to be electro-plated.

20. In a device of the character described, the combination of an endless chain having a portion thereof extending through an electro-plating solution, a bus-bar constituting a track for said carrier, and rotatable means journaled in said chain and traveling on said track for supporting and rotating work to be electro-plated.

GEORGE C. PINGER.